(12) United States Patent
Ijiri

(10) Patent No.: US 11,361,424 B2
(45) Date of Patent: Jun. 14, 2022

(54) NEURAL NETWORK-TYPE IMAGE PROCESSING DEVICE, APPEARANCE INSPECTION APPARATUS AND APPEARANCE INSPECTION METHOD

(71) Applicant: OMRON Corporation, Kyoto (JP)

(72) Inventor: Yoshihisa Ijiri, Tokyo (JP)

(73) Assignee: OMRON Corporation, Kyoto (JP)

( * ) Notice: Subject to any disclaimer, the term of this patent is extended or adjusted under 35 U.S.C. 154(b) by 91 days.

(21) Appl. No.: 16/976,471

(22) PCT Filed: Feb. 20, 2019

(86) PCT No.: PCT/JP2019/006184
§ 371 (c)(1),
(2) Date: Aug. 27, 2020

(87) PCT Pub. No.: WO2019/176479
PCT Pub. Date: Sep. 19, 2019

(65) Prior Publication Data
US 2021/0004954 A1 Jan. 7, 2021

(30) Foreign Application Priority Data
Mar. 14, 2018 (JP) .............................. JP2018-047256

(51) Int. Cl.
*G06T 7/00* (2017.01)
*G06N 3/04* (2006.01)
(52) U.S. Cl.
CPC .............. *G06T 7/0004* (2013.01); *G06N 3/04* (2013.01); *G06T 2207/20032* (2013.01);
(Continued)
(58) Field of Classification Search
CPC ......... G06T 7/0004; G06T 2207/20032; G06T 2207/20081; G06T 2207/20084;
(Continued)

(56) References Cited

U.S. PATENT DOCUMENTS 9,799,098 B2 * 10/2017 Seung ................... G06V 10/454
10,095,977 B1 * 10/2018 Kim ......................... G06T 7/11
(Continued)

FOREIGN PATENT DOCUMENTS

JP          H0630253          2/1994
JP          2004362440         12/2004
(Continued)

OTHER PUBLICATIONS

"International Search Report (Form PCT/ISA/210) of PCT/JP2019/006184," dated May 28, 2019, with English translation thereof, pp. 1-4.
(Continued)

*Primary Examiner* — Ping Y Hsieh
(74) *Attorney, Agent, or Firm* — JCIPRNET

(57) ABSTRACT

This neural network-type image processing device is provided with an input layer which comprises one unit where an input image is inputted, an output layer which comprises one unit where an output image is outputted, and multiple intermediate layers which are arranged between the input layer and the output layer and each of which comprises multiple units, the unit of the input layer, the units of the intermediate layers, and the unit of the output layer are fully connected with connection coefficients. The units of the intermediate layers are image processing modules which perform image processing on the image inputted to said units. The input image is inputted from the unit of the input layer, passes through the units of the intermediate layers, and is then outputted as an output image from the unit of the output layer; the connection coefficients are updated with learning based on a backpropagation algorithm.

20 Claims, 5 Drawing Sheets

(52) U.S. Cl.
CPC ............ *G06T 2207/20081* (2013.01); *G06T 2207/20084* (2013.01); *G06T 2207/30108* (2013.01)

(58) Field of Classification Search
CPC ........ G06T 2207/30108; G06T 7/0002; G06N 3/04; G06N 3/084; G01N 21/88
See application file for complete search history.

(56) References Cited

U.S. PATENT DOCUMENTS

| | | | |
|---|---|---|---|
| 2016/0209995 A1 | 7/2016 | Jeon et al. | |
| 2018/0240219 A1* | 8/2018 | Mentl | G06T 11/008 |
| 2018/0341248 A1* | 11/2018 | Mehr | G06N 3/08 |
| 2019/0228266 A1* | 7/2019 | Habibian | G06K 9/6262 |

FOREIGN PATENT DOCUMENTS

| | | |
|---|---|---|
| JP | 2012021914 | 2/2012 |
| JP | 2017097585 | 6/2017 |

OTHER PUBLICATIONS

"Written Opinion of the International Searching Authority (Form PCT/ISA/237) of PCT/JP2019/006184," dated May 28, 2019, with English translation thereof, pp. 1-8.

Ryo Shimizu, "Well-understood artificial intelligence," Kadokawa Corporation, 3rd Edition, Jan. 2017, pp. 1-11.

Edgar Simo-Serra, et al., "Learning to Simplify: Fully Convolutional Networks for Rough Sketch Cleanup," ACM Transactions on Graphics, vol. 35, Jul. 2016, pp. 1-11.

Shimizu Shimbun, "A well-known artificial intelligence Artificial Intelligence", Kadokawa Corporation Tsukada Seiko, Jan. 25, 2017, pp. 1-13.

Edgar Simo-Serra et al., "Learning To Simplify: Fully Convolutional Networks for Rough Sketch Cleanup", ACM Transactions on Graphics, Jul. 2016, pp. 1-12.

"Office Action of Japan Counterpart Application", dated Aug. 4, 2020, with English translation thereof, pp. 1-8.

* cited by examiner

NEURAL NETWORK-TYPE IMAGE PROCESSING DEVICE, APPEARANCE INSPECTION APPARATUS AND APPEARANCE INSPECTION METHOD

CROSS-REFERENCE TO RELATED APPLICATION

This application is a 371 application of the International PCT application serial no. PCT/JP2019/006184, filed on Feb. 20, 2019, which claims the priority benefits of Japan Patent Application No. 2018-047256, filed on Mar. 14, 2018. The entirety of each of the above-mentioned patent applications is hereby incorporated by reference herein and made a part of this specification.

TECHNICAL FIELD

The present invention relates to a neural network-type image processing device, an appearance inspection apparatus including the same, and an appearance inspection method.

BACKGROUND

Conventionally, an appearance inspection apparatus using image processing has been proposed. This appearance inspection apparatus is configured such that image processing such as pattern matching and edge extraction processing is performed on an input image that is an inspection target and then appearance inspection is performed on the image after image processing (for example, Patent Literature 1).

CITATION LIST

Patent Literature

[Patent Literature 1]
Japanese Patent Laid-Open No. 2012-21914

SUMMARY

Technical Problem

However, various types of image processing need to be performed on an input image that is an inspection target such that the input image becomes an image suitable for appearance inspection. However, there are many combinations or sequences of such types of image processing, and thus it is necessary to determine a combination or a sequence of pieces of image processing through trial and error by a user. However, there is a problem of large burden on the user in such a technique.

Further, such a problem may be generated in all image processing devices which perform at least one type of image processing in order to obtain a desired output image from an input image as well as image processing for appearance inspection apparatuses. An objective of the present invention devised to solve this problem is to provide a neural network-type image processing device, an appearance inspection apparatus including the same, and an appearance inspection method which can easily obtain a desired output image from an input image.

Solution to Problem

A neural network-type image processing device according to the present disclosure includes: an input layer having one unit to which an input image is input; an output layer having one unit from which an output image is output; and a plurality of intermediate layers arranged between the input layer and the output layer and each having a plurality of units, wherein the unit of the input layer, the units of the intermediate layers, and the unit of the output layer are fully connected with connection coefficients, wherein each of the units of each of the intermediate layers is an image processing module which performs image processing on an image input to the units, and the input image is input through the unit of the input layer, passes through the units of the intermediate layers, and is then output as an output image from the unit of the output layer, and the connection coefficients are updated according to learning using a back propagation method.

According to this configuration, it is possible to easily obtain a desired output image with respect to an input image because the image processing device has a neural network type structure. In addition, the units constituting the intermediate layers have image processing modules. Accordingly, if connection coefficients set according to learning are analyzed, the strength of connection between image processing modules can be ascertained and thus which image processing module affects a process in which an output image is obtained from an input image can be ascertained. Therefore, a user can arbitrarily adjust the structure of each layer, such as changing the sequence of image processing modules, changing parameters of image processing, or deleting a specific image processing module. For example, since an image processing module connected with a small connection coefficient is unlikely to be used, this image processing module can be deleted or changed to other image processing modules for optimization.

In the aforementioned neural network-type image processing device, an activation function of the units of each of the intermediate layers may include a differentiable image processing function representing image processing of the image processing modules.

In the aforementioned neural network-type image processing device, image processing modules of different types may be provided in each of the intermediate layers.

In the aforementioned neural network-type image processing device, the plurality of image processing modules provided in each of the intermediate layers may be identical.

In the aforementioned neural network-type image processing device, each of the image processing modules may be configured as any of a Gaussian filter, an edge extraction filter, a smoothing filter, a median filter, and a Sobel filter.

In the aforementioned neural network-type image processing device, one of the plurality of image processing modules provided in each of the intermediate layers may be a module with respect to identify mapping.

In the aforementioned neural network-type image processing device, the image processing modules applied until output of the output image from the input image, and connection coefficients of the applied image processing modules can be output along with output of the output image from the output layer.

An appearance inspection apparatus according to the present disclosure includes: an imaging unit which images an inspection object; and any of the aforementioned neural network-type image processing devices, wherein the neural network-type image processing device is trained such that an image captured by the imaging unit is used as an input image and an image for appearance inspection is used as an output image.

The aforementioned appearance inspection apparatus may further include a determination unit which performs appearance inspection on the output image and outputs an inspection result.

An appearance inspection method according to the present disclosure includes: a step of preparing any of the aforementioned neural network-type image processing devices trained such that a captured image of the inspection object is used as the input image and an image for appearance inspection is used as the output image; a step of imaging the inspection object; and a step of inputting the captured image of the inspection object to the neural network-type image processing device as the input image and outputting the output image.

The appearance inspection method may further include a step of performing appearance inspection on the output image and outputting an inspection result.

Advantageous Effects of Invention

According to the present invention, it is possible to obtain a desired output image from an input image.

DESCRIPTION OF EMBODIMENTS

Hereinafter, an embodiment of a neural network-type image processing device according to the present invention will be described with reference to the drawings. However, the present embodiment which will be described below is merely an example of the present invention in all aspects. Needless to say, various improvements and modifications can be made without departing from the scope of the present invention. That is, in implementation of the present invention, a specific configuration according to an embodiment may be appropriately employed. Meanwhile, although data appearing in the present embodiment is described using a natural language, more specifically, the data is designated using a quasi-language recognizable by a computer, commands, parameters, a machine language, and the like.

1. Applied Example

Figure 1:
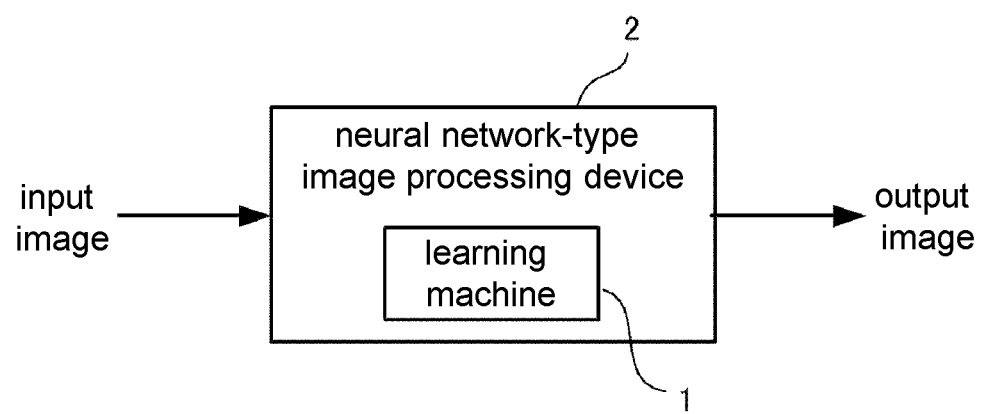
FIG. 1 is a block diagram showing an overview of an embodiment of an image processing device of the present invention.

Hereinafter, a neural network-type image processing device (which may be simply referred to as an "image processing device" hereinafter) according to the present embodiment will be described with reference to FIG. 1. FIG. 1 is a diagram showing an overview of the neural network-type image processing device according to the present embodiment.

As shown in FIG. 1, this image processing device 2 is a device that performs image processing on an input image and outputs a desired output image. For example, when appearance inspection of an object is performed as will be described later, the image processing device 2 performs image processing such as edge extraction and blurring on an input image acquired by imaging the appearance of the object such that appearance inspection can be performed, and includes a trained learning machine 1 in order to perform appropriate image processing on the input image.

Figure 2:
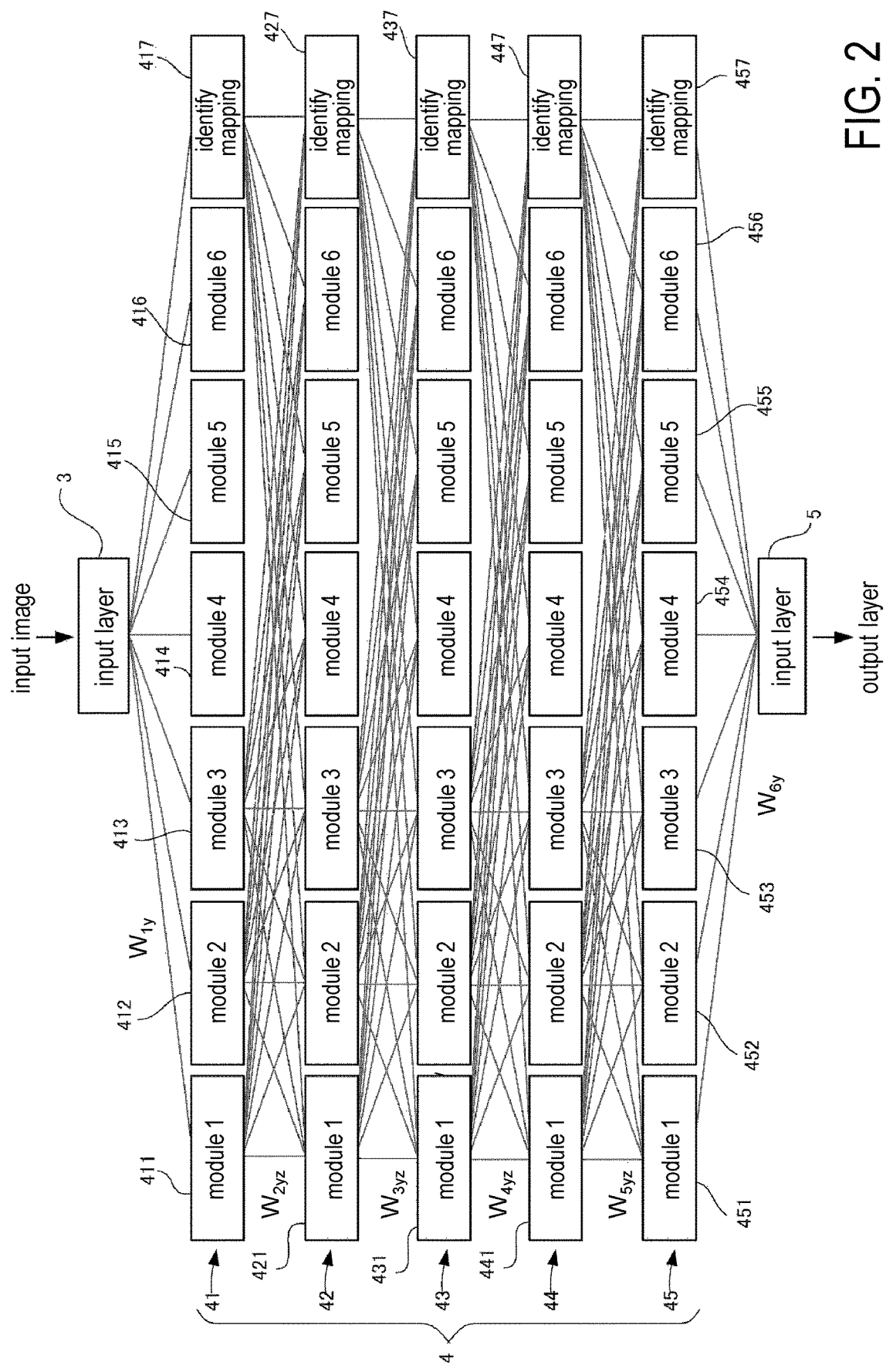
FIG. 2 is a diagram showing an outline structure of a learning machine of the image processing device of FIG. 1.

Specifically, the image processing device 2 includes the learning machine 1 as shown in FIG. 2. As shown in FIG. 2, this learning machine 1 has a multilayered neural network type structure used for so-called deep learning and includes an input layer 3, multiple intermediate layers (hidden layers) 4, and an output layer 5 in this order from an input side. Units having the same function as a neural network are provided in the input layer 3, each intermediate layer 4, and the output layer 5. In the following description, the input layer 3 and the output layer 5 include units. In addition, the intermediate layers 4 are as follows.

The learning machine 1 of FIG. 2 includes five intermediate layers 41 to 45, and seven image processing modules (hereinafter referred to as simply a module) are provided in each intermediate layer 41 to 45 as units. In addition, outputs of the input layer 3 become inputs of the intermediate layers 4 and outputs of the intermediate layers 4 become inputs of the output layer 5. Further, an input image is input to the input layer 3 and an output image is output from the output layer 5. Meanwhile, it is assumed that the five intermediate layers are referred to as first, second, third, fourth and fifth intermediate layers 41 to 45 from the side of the input layer in the following. In addition, it is assumed that the modules constituting each intermediate layers 41 to 45 are referred to as first, second, third, fourth, fifth, sixth and seventh modules 411 to 457.

The modules 411 to 457 constituting the intermediate layers 41 to 45 are configured as image processing modules. That is, the modules 411 to 457 are configured such that an image input to any module of the intermediate layers 41 to 45 is subjected to image processing and then output. In addition, the input layer 3, the modules 411 to 457 of the intermediate layers 41 to 45, and the output layer 5 are fully connected with connection coefficients W. Here, it is assumed that a connection coefficient is represented as $W_{xyz}$ (x, y and z are integers, however, z may not be present with respect to connection of the input layer 3 and the first intermediate layer 41 and connection of the fifth intermediate layer 45 and the output layer 5). For example, a connection coefficient with respect to the first module 411 of the first intermediate layer 41 and the first module 421 of the second intermediate layer 42 is represented as $W_{211}$, and a connection coefficient with respect to the fifth module 455 of the fifth intermediate layer 45 and the output layer 5 is represented as $W_{65}$.

Meanwhile, the input layer 3 is composed of one unit, and a whole input image that is a processing target is input to the one unit. In the same manner, the output layer 5 is also composed of one unit, and a whole output image on which image processing has been performed is output from the one unit. Further, an image is input to each unit constituting the intermediate layers 41 to 45, that is, each image processing module, and image processing is performed thereon.

Threshold values are set in the modules 411 to 457 and, basically, outputs of the modules 411 to 457 are determined according to whether the sums of products of inputs and weights exceed the threshold values. Meanwhile, this configuration of the learning machine 1 (e.g., the number of layers, the number of modules in each layer, a connection coefficient between modules, and an activation function of each module) and information representing the threshold values of the modules 411 to 457 are included in learning result data 225 which will be described later.

The activation functions of the modules 411 to 457 of the intermediate layers 41 to 45 include, for example, differentiable image processing functions representing image processing of the respective modules. Although such image processing functions are not particularly limited, for example, a Gaussian function for executing Gaussian blurring, various types of edge extraction function for performing edge extraction, a smoothing filter, a median filter, a sobel filter, and the like can be employed. In addition, it is also possible to generate image processing modules having different image processing functions with changed parameters even for the same image function.

Although seven modules are provided in each of the intermediate layers 41 to 45 in the present embodiment, these seven modules are different. That is, six image processing modules represented as modules 1 to 6 and a single module with respect to identity mapping are provided, as shown in FIG. 2. The modules 1 to 6 are image processing modules of different types or having different parameters. For example, the modules 1 to 3 can be Gaussian filters having different parameters and the modules 4 to 6 can be edge extraction filters having different parameters. In addition, the image processing module with respect to identify mapping outputs an image input thereto without performing image processing thereon. Further, all intermediate layers 41 to 45 have modules of the same type, as shown in FIG. 2.

Figure 3:
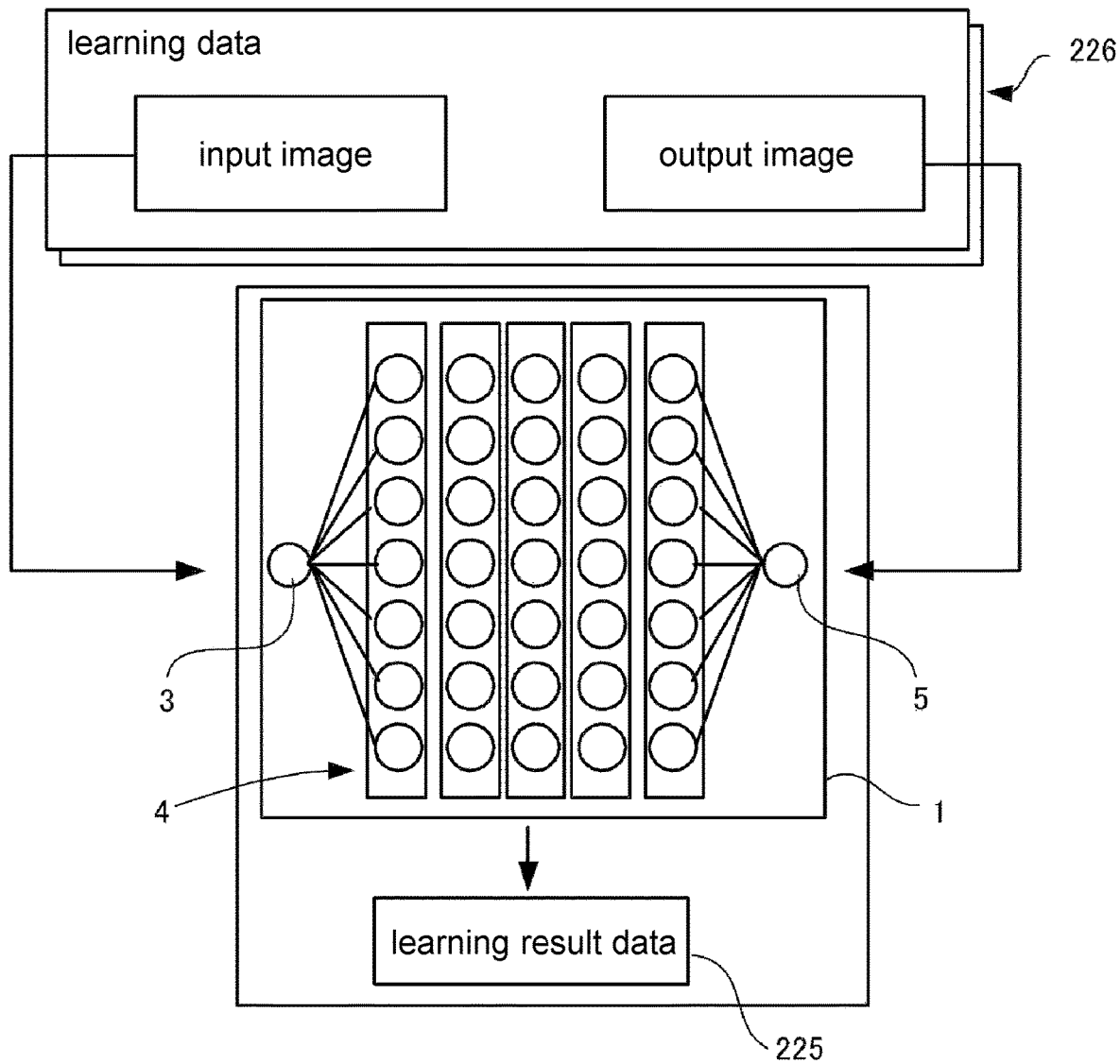
FIG. 3 is a diagram showing an example of learning of the learning machine of the image processing device of FIG. 1.

Learning of the learning machine 1 configured in this manner is performed through a back propagation method such that the connection coefficients $W_{xyz}$ are updated. For example, learning of the learning machine 1 is performed using learning data having an input image and an output image, as shown in FIG. 3. For example, a captured image is used as an input image, an image obtained by performing various types of image processing on the captured image is used as an output image, and learning data (teacher data) having a plurality of combinations of the input image and the output image can be prepared. When an input image is input to the learning machine 1 trained in this manner, a desired output image is acquired.

Then, it is possible to ascertain a module by which image processing has been performed on an input image to obtain an output image by analyzing the connection coefficients $W_{xyz}$ obtained as described above. Accordingly, since an image processing module connected with a small connection coefficient, for example, is not used, this image processing module can be changed to other image processing modules for optimization.

Although the image processing device according to the present embodiment can be applied to various types of processing, an example in which this image processing device is applied to an appearance inspection apparatus will be described below. This appearance inspection apparatus performs image processing on a captured image of an inspection object such that appearance inspection is easily performed. Hereinafter, the appearance inspection apparatus will be described in detail.

2. Configuration Example

2-1. Hardware Configuration

Figure 4:
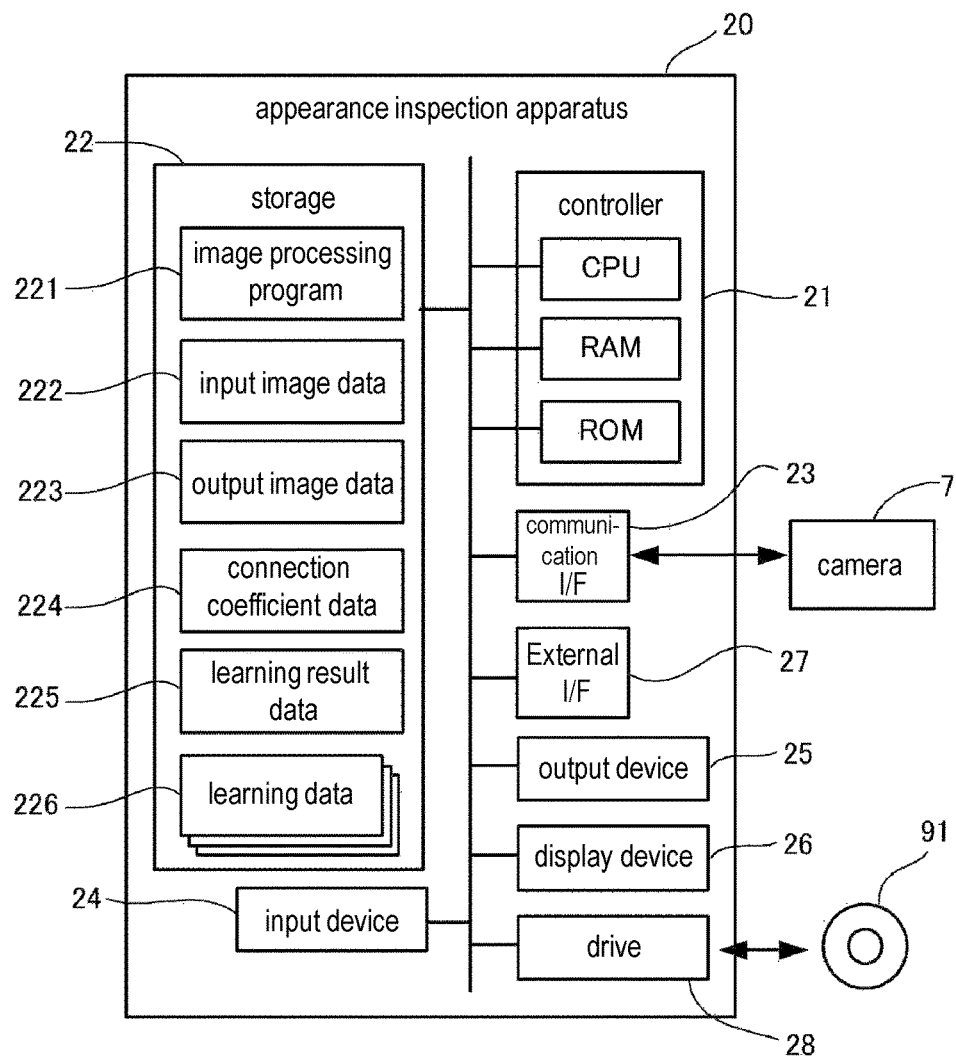
FIG. 4 is a block diagram showing a hardware configuration of an appearance inspection apparatus according to the present invention.

First, a hardware configuration of the appearance inspection apparatus according to the present embodiment will be described with reference to FIG. 4. FIG. 4 is a block diagram showing the hardware configuration of the appearance inspection apparatus according to the present embodiment.

2-1-1. Camera

Although a camera 7 shown in FIG. 4 is not particularly limited and a known camera can be used, it is desirable that the camera 7 be able to acquire an image with a degree of resolution by which appearance inspection can be performed.

2-1-2. Appearance Inspection Apparatus

As shown in FIG. 4, the appearance inspection apparatus 20 according to the present embodiment is a computer in which a controller 21, a storage 22, a communication interface 23, an input device 24, an output device 25, a display device 26, an external interface 27, and a drive 28 are electrically connected. Meanwhile, in FIG. 4, the communication interface and the external interface are represented as "communication I/F" and "external I/F."

The controller 21 includes a central processing unit (CPU), a random access memory (RAM), a read only memory (ROM), and the like and controls each component according to information processing. The storage 22 is an auxiliary storage device such as a hard disk drive or a solid state drive, for example, and stores an image processing program 221 executed in the controller 21, input image data 222, output image data 223, connection coefficient data 224, learning result data 225 representing information about the learning machine 1, learning data 226 for being learnt by the learning machine 1, and the like. In addition, the storage 22 can also store various types of data necessary for operation of the appearance inspection apparatus 20.

The image processing program 221 receives an input image and outputs an output image in response to the input image for image processing performed by the aforementioned learning machine 1. The input image data 222 is image data obtained by imaging an inspection object, and the output image data 223 is image data after image processing is performed by the learning machine 1. The connection coefficient data 224 is data with respect to connection coefficients W of the trained learning machine 1. In addition, the learning result data 225 is data for setting the trained learning machine 1. The learning data 226 is a data used for current learning of the learning machine 1.

The communication interface 23 is, for example, a wired local area network (LAN) module, a wireless LAN module, or the like and is an interface for wired or wireless communication via a network. For example, the communication interface 23 is used to communicate with the camera 7 or transmit information about image processing to the outside. Various instructions such as operation of the input device 24 can be input. The output device 25 is, for example, a device for performing output, such as a speaker. The display device 26 can be configured as a display or the like and can display, for example, an inspection result and the like. The external interface 27 is a universal serial bus (USB) port or the like and is an interface for connecting with an external device.

The drive 28 is, for example, a compact disk (CD) drive, a digital versatile disk (DVD) drive, or the like and is a device for reading a program stored in a storage medium 91. A type of the drive 28 may be appropriately selected on the basis of the type of the storage medium 91. At least one of the aforementioned various types of data 221 to 226 stored in the storage 22 may be stored in the storage medium 91.

In addition, the input image data 222 and the output image data 223 can be stored in the RAM of the controller 21.

The storage medium 91 is a medium that accumulates information such as programs according to an electrical, magnetic, optical, mechanical or chemical operation such that a computer, other devices, machines, and the like can read information such as programs recorded thereon. The appearance inspection apparatus 20 may acquire the various types of data 221 to 226 from the storage medium 91.

Here, as an example of the storage medium 91, a disk type storage medium such as a CD or a DVD is illustrated in FIG. 4. However, the type of the storage medium 91 is not limited to a disk type and may be types other than a disk type. As a storage medium other than a disk type, for example, a semiconductor memory such as a flash memory can be conceived.

Meanwhile, with respect to the specific hardware configuration of the appearance inspection apparatus 20, omission, substitution and addition of components may be appropriately performed according to embodiments. For example, the controller 21 may include a plurality of processors. The appearance inspection apparatus 20 may be composed of a plurality of information processing devices. Further, the appearance inspection apparatus 20 may use a general-purpose desk-top personal computer (PC), a tablet PC, and the like in addition to an information processing device exclusively designed for a provided service.

2-2. Functional Configuration of Appearance Inspection Apparatus

Figure 5:
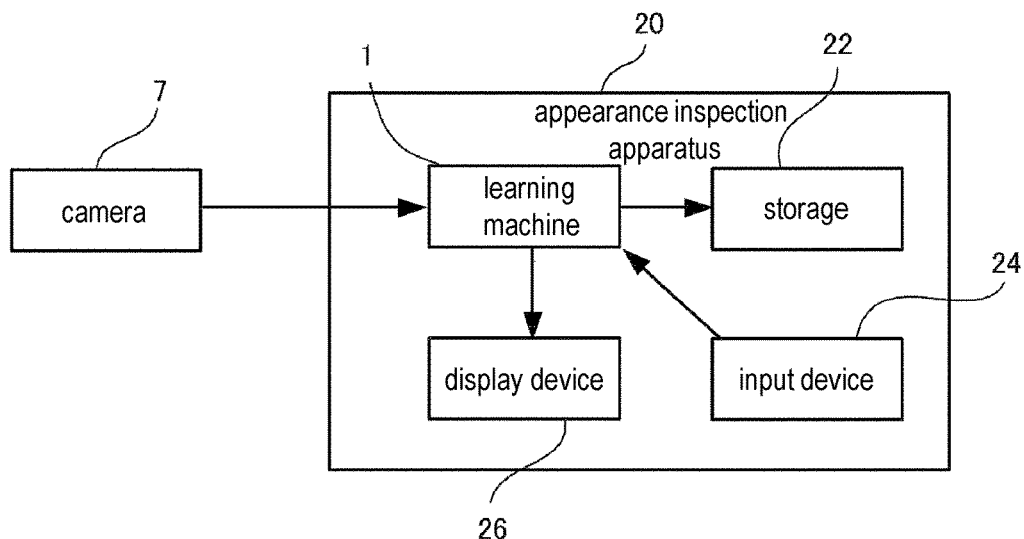
FIG. 5 is a block diagram showing a functional configuration of the appearance inspection apparatus of FIG. 4.

Next, an example of a functional configuration of the appearance inspection apparatus according to the present embodiment will be described with reference to FIG. 4 and FIG. 5. FIG. 5 is a block diagram showing the functional configuration of the appearance inspection apparatus.

As shown in FIG. 4, the controller 21 of the appearance inspection apparatus 20 develops the image processing program 221 stored in the storage 22 in the RAM. Then, the controller 21 interprets and executes this program 221 developed in the RAM through the CPU to control each component. Accordingly, the appearance inspection apparatus 20 according to the present embodiment serves as a computer including the learning machine 1, as shown in FIG. 5.

While the learning machine 1 has been described, an image of an inspection object captured by the camera 7 is received as an input image. Then, learning is performed such that image processing for obtaining an output image through which appearance inspection is easily performed is executed. For example, learning can be performed such that image processing such as appropriate edge extraction processing is performed on a specific part related to appearance inspection in the input image, or learning can be performed such that image processing is not performed or blurring processing or the like is performed on a part unrelated to inspection. Further, learning may be performed such that different types of image processing are performed on a specific part.

2-3. Operation of Appearance Inspection Apparatus

Figure 6:
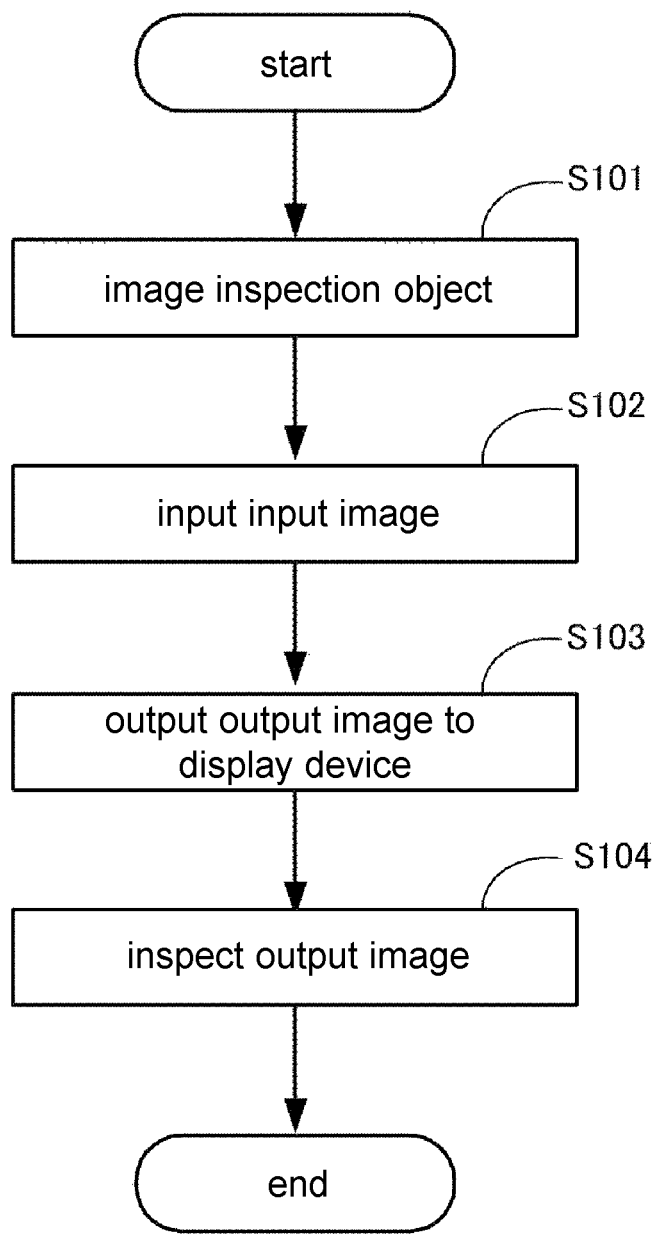
FIG. 6 is a flowchart illustrating an example of a processing procedure in the appearance inspection apparatus of FIG. 4.

Next, an operation example of the appearance inspection apparatus 2 will be described with reference to FIG. 6. FIG. 6 is a flowchart illustrating an example of a processing procedure of the appearance inspection apparatus. Meanwhile, a processing procedure described below is merely an example and each process may be changed. Further, with respect to the processing procedure described below, omission, substitution and addition of steps may be appropriately performed according to embodiments.

As shown in FIG. 6, first, an inspection object is imaged using the camera 7 to acquire an input image (step S101). Next, the acquired input image is input to the learning machine 1 (step S102). Subsequently, an output image output from the learning machine 1 is displayed through the display device 26 (step S103). Here, the output image is stored in the storage 22. Subsequently, inspection of the output image displayed on the display device 26 is performed (step S104). An inspection method is not particularly limited and inspection can be performed through image processing in addition to inspection through the eyes of a user. When inspection through image processing is performed, a determination unit which performs appearance inspection according to image processing on the output image can be provided as a functional component in FIG. 5, for example. Although there are various aspects of the determination unit, for example, the output image can be input to a learning machine trained to be able to distinguish defective products from non-defective products according to machine learning and distinguishing of defective products from non-defective products can thus be performed. In addition, an inspection result can be displayed through the display device 26 or stored in the storage 22.

3. Features

The image processing device according to the present embodiment has a neural network-type structure and thus can easily obtain a desired output image with respect to an input image. In addition, the image processing device has image processing modules as units constituting the intermediate layers 4. Accordingly, if connection coefficients $W_{xyz}$ set through the trained learning machine 1 are analyzed, it is possible to ascertain an image processing module by which image processing is performed on an input image to obtain an output image. Therefore, a user can arbitrarily adjust the structure of the learning machine 1 such as changing the sequence of image processing modules, changing parameters of image processing, or deleting a specific image processing module. For example, since an image processing module connected with a small connection coefficient is not used, this image processing module can be deleted or changed to other image processing modules for optimization. Thereafter, re-learning of the learning machine 1 can be performed.

4. Modified Examples

Although an embodiment of the present invention has been described in detail, the above description is merely an example of the present invention in all aspects. Needless to say, various improvements and modifications can be made without departing from the scope of the present invention. For example, modifications can be made as follows. Meanwhile, in the following, the same reference signs will be used for the same components as those in the above-described embodiment and description of the same points as those in the above-described embodiments will be appropriately omitted. Modified examples below may be appropriately combined.

<1>

The structure of the learning machine 1 described in the above embodiment is an example and various modifications are possible. For example, the number of intermediate layers 4 and the number of modules included in each intermediate layer 4 are not particularly limited and can be appropriately set in accordance with processing that is a target. For example, different numbers of modules may be included in the respective intermediate layers 4.

In addition, although all intermediate layers 4 have the same image processing modules in the above-described embodiment, the intermediate layers may have different modules. Further, although a module with respect to identity mapping is provided in each intermediate layer, it is not necessarily required. However, if a module with respect to identity mapping is provided in each intermediate layer, it is possible to prevent unnecessary image processing from being performed.

<2>

Although the neural network-type image processing device and the appearance inspection apparatus using the same have been described in the above embodiments, this image processing device can be used for purposes other than appearance inspection. That is, when the image processing device is used for the purpose of performing at least one type of image processing in order to obtain a desired output image from an input image, it can also be used for a purpose other than the appearance inspection apparatus.

What is claimed is:

1. A neural network-type image processing device comprising:
    an input layer having one unit to which an input image is input, wherein the input image comprises a captured image of an inspection object;
    an output layer having one unit from which an output image is output, wherein the output image comprises an image for appearance inspection; and
    a plurality of intermediate layers arranged between the input layer and the output layer and each having a plurality of units, wherein the unit of the input layer, the units of the intermediate layers, and the unit of the output layer are fully connected with connection coefficients,
    wherein each of the units of each of the intermediate layers is an image processing module which performs image processing on an image input to the units of the intermediate layers, and
    the input image is input through the unit of the input layer, passes through the units of the intermediate layers, and is then output as an output image from the unit of the output layer, and
    the connection coefficients are updated according to learning using a back propagation method.

2. The neural network-type image processing device according to claim 1, wherein an activation function of the units of each of the intermediate layers includes a differentiable image processing function representing image processing of the image processing modules.

3. The neural network-type image processing device according to claim 2, wherein the image processing modules of different types are provided in each of the intermediate layers.

4. The neural network-type image processing device according to claim 3, wherein the plurality of image processing modules provided in each of the intermediate layers are identical.

5. The neural network-type image processing device according to claim 3, wherein each of the image processing modules is configured as any of a Gaussian filter, an edge extraction filter, a smoothing filter, a median filter, and a sobel filter.

6. The neural network-type image processing device according to claim 2, wherein the plurality of image processing modules provided in each of the intermediate layers are identical.

7. The neural network-type image processing device according to claim 6, wherein each of the image processing modules is configured as any of a Gaussian filter, an edge extraction filter, a smoothing filter, a median filter, and a sobel filter.

8. The neural network-type image processing device according to claim 2, wherein each of the image processing modules is configured as any of a Gaussian filter, an edge extraction filter, a smoothing filter, a median filter, and a sobel filter.

9. The neural network-type image processing device according to claim 1, wherein the image processing modules of different types are provided in each of the intermediate layers.

10. The neural network-type image processing device according to claim 9, wherein the plurality of image processing modules provided in each of the intermediate layers are identical.

11. The neural network-type image processing device according to claim 9, wherein each of the image processing modules is configured as any of a Gaussian filter, an edge extraction filter, a smoothing filter, a median filter, and a sobel filter.

12. The neural network-type image processing device according to claim 1, wherein the plurality of image processing modules provided in each of the intermediate layers are identical.

13. The neural network-type image processing device according to claim 12, wherein each of the image processing modules is configured as any of a Gaussian filter, an edge extraction filter, a smoothing filter, a median filter, and a sobel filter.

14. The neural network-type image processing device according to claim 1, wherein each of the image processing modules is configured as any of a Gaussian filter, an edge extraction filter, a smoothing filter, a median filter, and a sobel filter.

15. The neural network-type image processing device according to claim 1, wherein one of the plurality of image processing modules provided in each of the intermediate layers is a module with respect to identify mapping.

16. The neural network-type image processing device according to claim 1, wherein the image processing modules applied to output of the output image from the input image, and connection coefficients of the applied image processing modules can be output along with output of the output image from the output layer.

17. An appearance inspection apparatus comprising:
    an imaging unit which images an inspection object; and
    the neural network-type image processing device according to claim 1,
    wherein the neural network-type image processing device is trained such that an image captured by the imaging unit is used as the input image and an image for appearance inspection is used as the output image.

18. The appearance inspection apparatus according to claim 17, further comprising a determination unit which performs appearance inspection on the output image and outputs an inspection result.

19. An appearance inspection method comprising:
    a step of preparing the neural network-type image processing device according to claim 1 which is trained such that a captured image of the inspection object is used as the input image and an image for appearance inspection is used as the output image;
a step of imaging the inspection object; and
a step of inputting the captured image of the inspection object to the neural network-type image processing device as the input image and outputting the output image.

20. The appearance inspection method according to claim 19, further comprising a step of performing appearance inspection on the output image and outputting an inspection result.

\* \* \* \* \*